US011809582B2

(12) United States Patent
Cobb

(10) Patent No.: US 11,809,582 B2
(45) Date of Patent: Nov. 7, 2023

(54) TECHNIQUES FOR SECURE DOCUMENT MANAGEMENT AND VERIFICATION

(71) Applicant: Douglas Cobb, Richmond Hill, GA (US)

(72) Inventor: Douglas Cobb, Richmond Hill, GA (US)

(*) Notice: Subject to any disclaimer, the term of this patent is extended or adjusted under 35 U.S.C. 154(b) by 461 days.

(21) Appl. No.: 17/245,069

(22) Filed: Apr. 30, 2021

(65) Prior Publication Data

US 2021/0357519 A1 Nov. 18, 2021

Related U.S. Application Data

(60) Provisional application No. 63/025,656, filed on May 15, 2020.

(51) Int. Cl.
| | |
|---|---|
| *G06F 21/62* | (2013.01) |
| *G06F 16/93* | (2019.01) |
| *G06F 40/20* | (2020.01) |
| *G06F 40/12* | (2020.01) |
| *H04L 67/06* | (2022.01) |

(52) U.S. Cl.
CPC .......... *G06F 21/6218* (2013.01); *G06F 16/93* (2019.01); *G06F 40/12* (2020.01); *G06F 40/20* (2020.01); *H04L 67/06* (2013.01)

(58) Field of Classification Search
CPC ...... G06F 21/6218; G06F 16/93; G06F 40/12; G06F 40/20; G06F 21/64; H04L 67/06; H04L 63/123; H04L 63/107; H04L 2463/062; H04L 2463/121; H04L 63/0435
See application file for complete search history.

(56) References Cited

U.S. PATENT DOCUMENTS

| | | | | |
|---|---|---|---|---|
| 2008/0197972 A1* | 8/2008 | Lawson | ................. | G07D 11/30 340/5.86 |
| 2013/0314555 A1* | 11/2013 | Vartanian | ............... | H04N 23/61 348/207.1 |
| 2015/0052615 A1* | 2/2015 | Gault | .................... | G06F 21/645 726/26 |
| 2016/0026827 A1* | 1/2016 | Ko | ...................... | G06F 21/6209 713/193 |
| 2019/0005268 A1* | 1/2019 | Gupta | .................... | G06F 21/64 |

* cited by examiner

*Primary Examiner* — Amie C. Lin
(74) *Attorney, Agent, or Firm* — DP IP GROUP; Franco S. De Liguori

(57) ABSTRACT

The present innovative solution solves the problem of managing secure documents so that they can be verified, and protected from tampering and illegal printing. A legal document is converted to a secure document by embedding into the legal document one or more security codes that have been encrypted with a standard of proprietary cryptographic algorithm. The security codes are supplemented by a QR code associated with the archive location of each page of the secure document, and stored at a server or database. The security codes stored in the document and can be printed together with the document, as a form of watermark, using UV-sensitive ink or toner at a security printer. The security codes are encrypted and can be printed on varying locations in the secure document pages, which are defined in a geolocation template, separately transmitted in encrypted format.

19 Claims, 7 Drawing Sheets

TECHNIQUES FOR SECURE DOCUMENT MANAGEMENT AND VERIFICATION

CROSS-REFERENCE TO RELATED APPLICATIONS

This application claims priority to U.S. Provisional Patent Application No. 63/025,656, filed on May 15, 2020, and entitled "LOCAL OR CLOUD-BASED CRM DATABASE WITH ALGORITHMS FOR GENERATING ENCRYPTED DOCUMENT IDENTIFICATION CODES FOR FUTURE IDENTIFICATION AND PROTECTION OF BOTH ELECTRONIC AND PRINTED DOCUMENTS".

BACKGROUND

Field

The present invention relates to a methodology, server, system, and software for secure document verification and management.

Background Information

Legal documents have been used for centuries for regulating business and other activities of everyday life. Such documents range from banknotes, wills, contracts, certificates, etc. and are used by every "civilized" society since the discovery of paper and its predecessors (like parchment, etc.). Such legal documents need to be authenticated and some sort of verification is needed to ensure that they are either originals, or certified copies. Typically, signatures, stamps or seals are used as means for authentication and verification. In older times, when the reproduction of documents, and of the means for authenticating and verifying them, were not accessible to the general public, such means were very effective in ensuring that the legal documents bearing these means were protected from illegal copying, or falsification by altering their content even in cases where a malicious person falsified a signature, since no person could easily falsify stamps and seals. So, the combined use of these means increased security against illegal acts for copying and falsifying documents.

In more recent years, technological advances in printing technology, as well as in stamping, made it easier for malicious persons and organizations to falsify documents and/or to illegally copy them.

Another long-established method for protecting legal documents was to include, among other security features (such as signatures, stamps and seals), a watermark. A typical example is a banknote. A watermark is a symbol or image embedded in a paper document during the production of the paper used in the document, or printed or stamped on the paper at a processing stage after the paper production, and before, during, or after printing the textual and/or visual content of the legal document. Watermarks may also be combined with paper made of special first materials or with a process that gives the paper special features not available in ordinary papers. Such paper making and watermarking technologies are strictly regulated and made available, typically, to governments, and specifically authorized third parties, thus keeping these technologies out of reach of the general public, non-authorized companies, and potential malignant persons.

Again, technological advances and illegal trade have made access to watermarking technologies easier than ever before. Nowadays, certain kinds of security printers can even be ordered on-line and delivered at one's doorstep in a matter of hours or days. So, watermarking and use of special papers is not as effective as it once was.

The last 2-3 decades and the rapid computer technology developments have brough a universal use of electronic documents which one can download and print at his personal printer. Such documents also need to be authenticated and their printing to be controlled, so as to avoid illegal duplicates and falsification by altering the document content. Technologies like electronic signatures have been introduced, which are now widespread and used even in ordinary software packages and services (e.g. DocuSign, HelloSign, Adobe Sign, etc.). To electronically sign a secure document, the user's or the recipient's computing apparatus, connects with an electronic signature server, or with an electronic signature module in the server.

Such products use features like digital watermarks, time-stamps, and electronic signatures, embedded in digital files in some form of metadata accompanying the content of the document.

When a document is ready to be signed, the creator specifies which fields need a response, enters the signer's email address and hits the send button. The forms will then appear in the signer's inbox with a unique, secure browser link. The signer does not need to download any apps or register for an account; they can just sign the document directly from the link. After the signature is received, the creator will get a notification that the signed document is ready. The authority or company managing the signing process may also send expiration alerts and signature reminders if the signer does not respond. When the document is complete, it is automatically archived and a final copy is sent to both parties.

Such solutions are very efficient in speeding up signing processes but do not necessarily guarantee that the final copies received by the two signing parties are exact copies of the original or that a third party has not falsified the content of the document. It is even possible for one of the receiving parties to falsify the signed document by altering its content and reprint it with a copy of the same electronic signatures that were included in the original signed document.

Based on the above problems identified for printed and electronic documents, there is a clear need for a server, system, and software that can regulate and safeguard printing, distribution and management of legal documents in a secure, tamper-proof way and which allows for easy verification of the validity of the content of printed and electronic documents.

SUMMARY

The present innovative solution solves the problem of managing secure documents so that they can be verified, and protected from tampering and illegal printing.

A legal document is converted to a secure document by embedding into the legal document one or more security codes that have been encrypted with a standard of proprietary cryptographic algorithm. The security codes are supplemented by a QR code associated with the identification of each page of the secure document, and stored at a server or database. The security codes stored in the document and can be printed together with the document, as a form of watermark, using UV-sensitive ink or toner at a security printer. The security codes are encrypted and can be printed on varying locations in the secure document pages, which are defined in a geolocation template, separately transmitted in encrypted format.

The security codes can be generated with a random security code generator, or using a statistical analysis module of the content of the secure document, or a natural language analysis module of the content of the secure document.

A timestamp is added every time the document is signed, amended, or printed.

The secure document can be associated with a number of attributes, like an account number at the server, a project number, an owner, a person authorized to access or print it, etc.

The secure document is archived and an electronic copy can be transmitted to a recipient for signing, amending, or printing.

The techniques of the present invention are implemented by a method, server, system and software running on the server.

DETAILED DESCRIPTION

The word "exemplary" is used herein to mean "serving as an example, instance, or illustration". Any embodiment described herein as "exemplary" is not necessarily to be construed as preferred or advantageous over other embodiments.

The acronym "AES" is intended to mean "Advanced Encryption Standard".

The acronym "CD" is intended to mean "Compact Disc".

The acronym "CRM" is intended to mean "Customer Relationship Management".

The acronym "DSL" is intended to mean "Digital Subscriber Line".

The acronym "DVD" is intended to mean "Digital Versatile Disc".

The acronym "HTTP" is intended to mean "HyperText Transfer Protocol".

The acronym "OTP" is intended to mean "One-Time-Password".

The acronym "QR" is intended to mean "Quick Response".

The acronym "UI" is intended to mean "User Interface".

The acronym "UV" is intended to mean "Ultra Violet".

The term "mobile device" may be used interchangeably with "client device" and "device with wireless capabilities".

The term "user" may be used interchangeably with "regular user", "ordinary user", and "client". It may also be used to mean "user of an application" or "user of a service".

The term "document" may be used interchangeably with "legal document". It may also be used to mean "document that bears security features" or "document for regulated use".

The term "system" may be used interchangeably with "device", "computing device", "apparatus", "computing apparatus", and "service", except where it is obvious to a reader of ordinary skill in related art that these terms refer to different things, as this is apparent by the context of the discussion in which they appear. Under any circumstance, and unless otherwise explicitly stated or implicitly hinted at in the description, these five terms should be considered to have the broadest meaning i.e., that of encompassing all four.

The term "server" may be used interchangeably with "secure document server", and "Customer Relationship Management (CRM) server for handling secure documents".

The term "module" may be used interchangeably with "unit" or "subunit", except where it is obvious to a reader of ordinary skill in related art that these terms refer to different things, as this is apparent by the context of the discussion in which they appear.

Parameters and names in lower-case and upper-case characters are intended to mean the same thing except where it is obvious to a reader of ordinary skill in related art that these terms refer to different things, as this is apparent by the context of the discussion in which they appear, or where a different meaning is disclosed in the following description.

Adding Security Codes to Legal Documents

Figure 1:
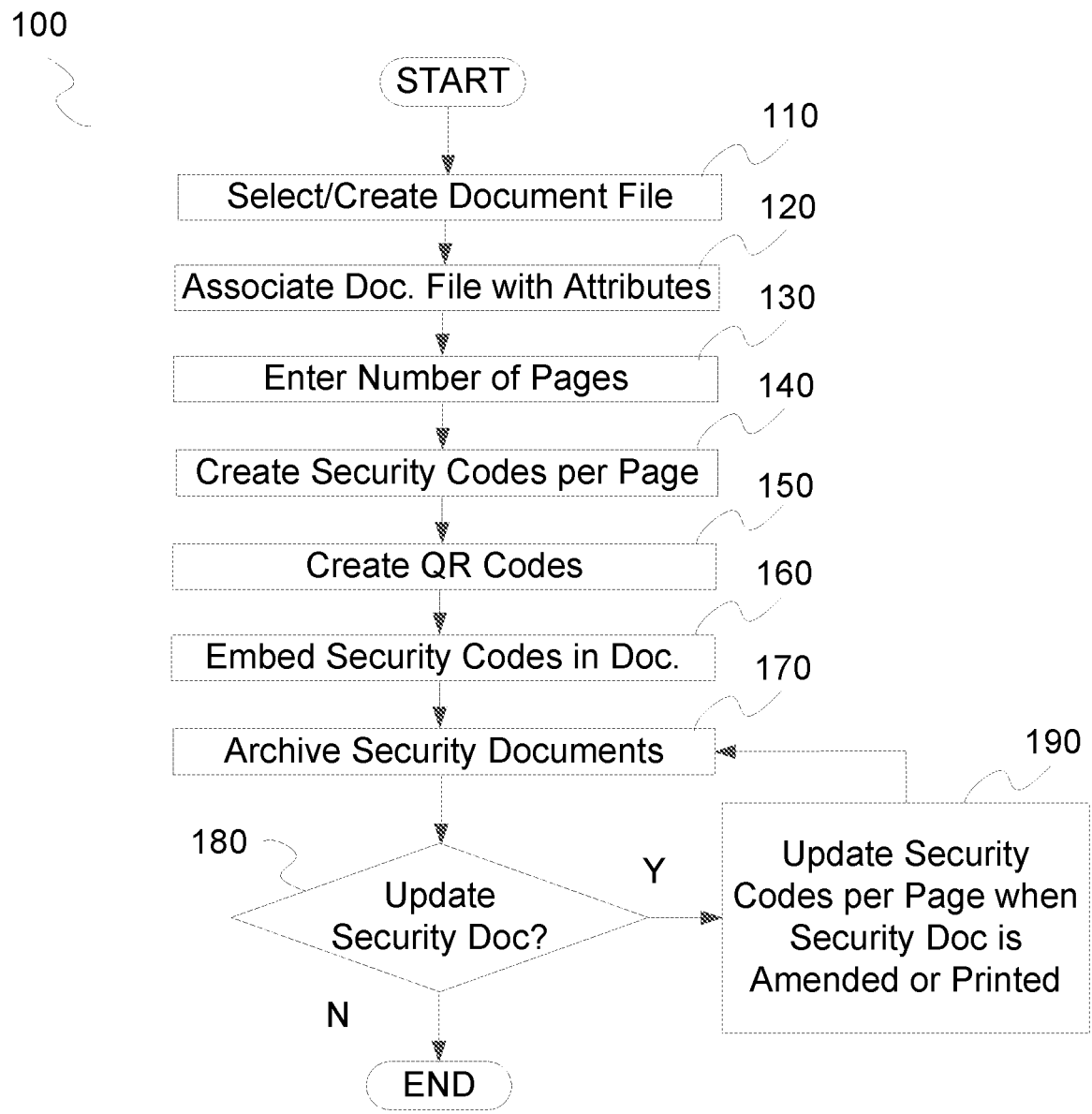
FIG. 1 shows a flowchart of the main steps of the invention.

FIG. 1 shows a flowchart of the main steps of the invention. Methodology 100 starts with a user, e.g., a human client, a company employee, or a computer system acting on behalf of the client or employee, connecting to a secure document server, termed a server (and which in alternative exemplary embodiments is a modified Customer Relationship Management (CRM) server), and selecting to create a new document 110. The server associates 120 the created document file with the client's or employee's credential and/or his choice of a corporate profile, project, document owner, and person allowed to process the document (other parameters may also be used) and prompts the user to enter the desired number of pages for the newly created document 130. The user may also enter any number of parameters associated with the document (e.g., a document description, state, owner, etc.).

In an alternative exemplary implementation, the user may upload to the server an existing digital document, instead of creating a new one in step 110.

Upon the user entering the desired number of pages for the new document, the server creates a set of security codes 140 for each page of the document. Any number of security codes may be used per page for increasing security and different sets of security codes are typically created for each page. These security codes are created using one or more random security code generators and/or cryptographic algorithms. For instance, a random security code generator module in the server, or at a random security code generator server connected with the server, is used to produce the random security codes.

In first variation of the present exemplary embodiments, the security codes are created using a statistical analysis module in the server, or at a statistical analysis server connected to the server, which analyzes the content of the corresponding page of the security document and creates one or more strings used as security codes.

In a second variation of the present exemplary embodiments, the security codes are created using a natural language analysis module in the server, or at a natural language analysis server connected to the server, which analyzes the language content of the corresponding page of the security document and one or more strings used as security codes.

As an optional feature, the created security codes may be divided into fragments of the security codes and recombined (i.e., scrambled) to new security codes by mixing and matching fragments from one security code with fragments from another security code within the same set of security codes (i.e., from the security codes associated with the same document page) or with security codes from other sets of security codes (i.e., from the security codes associated with the other pages of the same document). The security codes are used to identify and verify each page of the document that is in possession of a person or system and can be used to compare it with an original electronic file of the document, archived by the server or other computing apparatus or database accessible by the server.

Together with the security codes, a new Quick Response (QR) code is created 150 for each page, and associated with the corresponding page of the document. The QR code is a visual representation of the identity of the document stored by the server or other computing apparatus or database accessible by the server, where the original electronic file is archived together with metadata associating the secure document with security codes, owner, editor, timestamps, etc.

The security codes and the QR code for each page of the document are embedded into the content of the corresponding page of the legal document prior to the server dispatching the document to a recipient (e.g., the owner of the document, or a third person or legal entity). This way, the server ensures that the electronic copy of the archived document has all the security features needed to verify and regulate the use of the document copy for the purpose of preventing illegal activities like falsification by altering the content of the document, creation of illegal copies, or illegal printing of the document (e.g. only a single hard-copy may be allowed to be printed).

The security codes are typically embedded 160 in the electronic copy of the document as metadata in encrypted format so as to prevent any human or legal entity, or computing apparatus, system, or software to tamper them or modify them for falsifying the document or for any other malicious purpose. The encryption is done using any standard cryptographic algorithm (e.g., Advanced Encryption Standard (AES)-256) and/or proprietary cryptographic algorithms, which are paired, one for encryption and one for decryption with corresponding encryption and decryption keys. These cryptographic algorithms may be used either in a cryptography module in the server, or at a cryptography server connected to the server.

The secure document (with the embedded metadata) is archived 170 at the server or other computing apparatus or database accessible by the server.

Any time the owner of the secure document edits the document 180, the security codes embedded in the document are updated by the server 190, and the secure document, with the updated security codes, is archived again 170.

Updating of the security codes 190 may also be performed by the server, every time the secure legal document is signed (e.g., when a contract is signed by the two or more contracting parties), printed, or duplicated. During these actions, a timestamp is also added to the metadata archived by the server and embedded to the secure document prior to distribution.

Printing Security Codes as Watermarks to Legal Documents

Figure 2:
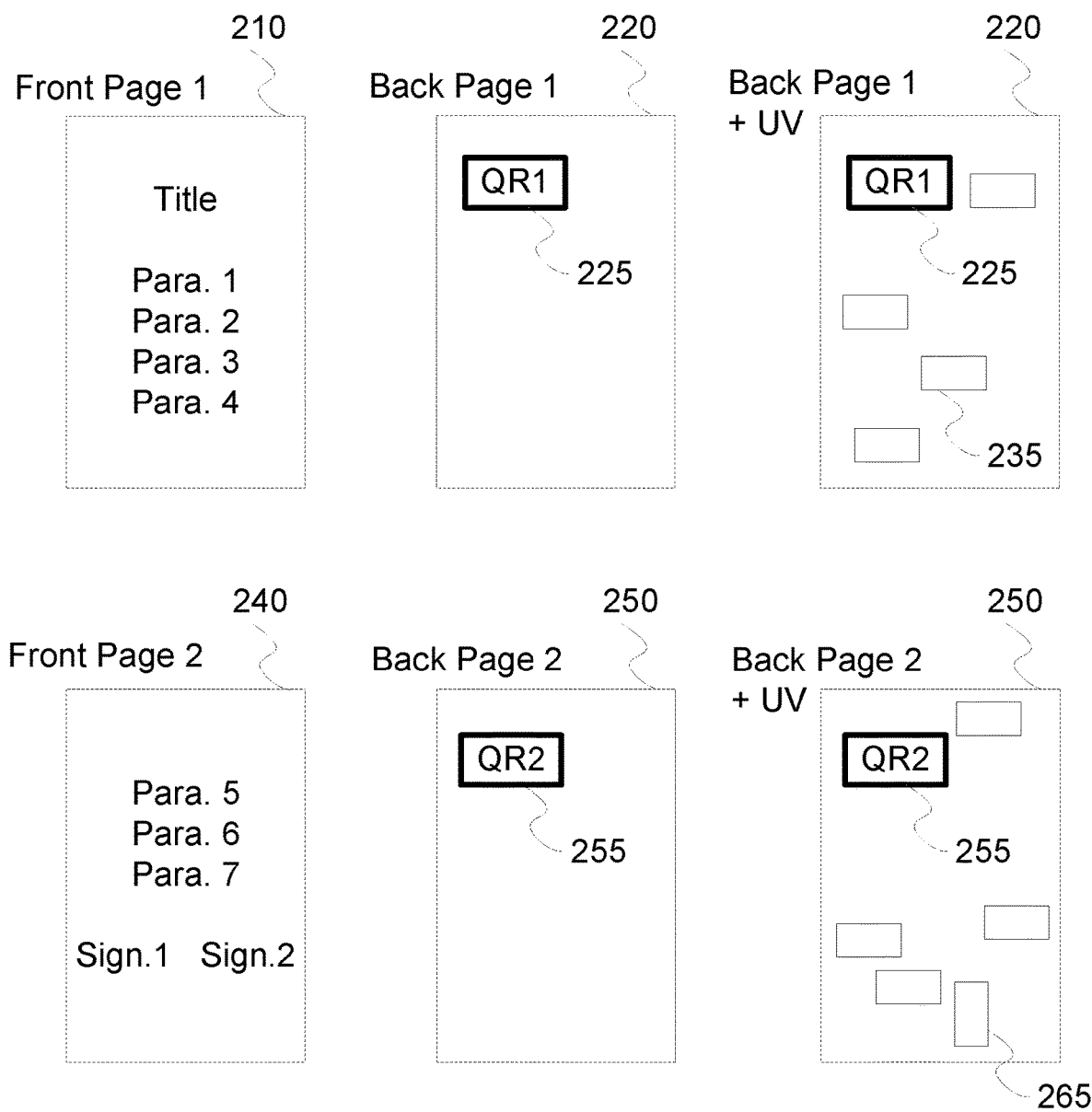
FIG. 2 is a diagram showing how a print copy of the electronic document is created.

FIG. 2 is a diagram showing how a print copy of the electronic document is created. Every time a copy of the secure legal document is needed, the owner of the document has the option of requesting a certified printed copy be printed by the server and dispatched to his address or to any other address the requests, or for receiving a certified electronic copy of the document and printing the certified copy himself.

In order to print a certified copy, the security codes and the QR codes need to be printed in a way that they certify that the document content is an exact copy of the archived original at the server or other computing apparatus or database accessible by the server. The current invention solves this problem by using a novel watermarking method.

An ordinary printer is used to print the secure document text (e.g. the content of a contract) on the front pages of sheets of paper of a size selected by the user when creating the new document, or of the size of the uploaded document.

On the back pages of the same sheets of paper the ordinary printer prints the QR code of the corresponding page. For special circumstances, there is an option to print the QR code on the front of the sheet within the header, footer or margin area.

Since no security codes or other security features are printed or otherwise included on the first page, for not altering the content of the document copy, these security codes are printed at the corresponding back pages of the same sheets, where the QR codes are printed. There is an exception of a special option to include the QR codes on the front page, in the header, footer or margin area of the page. The security codes are printed as a form of watermark. Although watermarking technology is known for many years, the present innovative solution uses a security printer to print invisible watermarks with Ultra Violet (UV)-visible ink or toner. The watermarks are visible only under UV light and thus invisible to human eye, forming a first layer of protection.

Optionally, the UV-sensitive ink or toner used to print the watermark security codes is selected so as to be visible to only a narrow range of UV light wavelengths. The user or computing apparatus trying to read the watermark should either known the appropriate wavelength of the UV-sensitive ink or toner, or be equipped with a UV light of varying wavelength and scan the back page of the document for reading the watermark. As a result, in order to falsify a printed document (i.e., its printed content on the front page of the paper sheet) the falsifier must be able to read the UV-sensitive watermark and then reproduce it in a falsified printed copy.

As a second level of protection, the location of the security code watermarks needs to be known in order to read the security codes and reconstitute them, since the printed security code watermarks may be scrambled security codes created from combining segments of the original security codes in a single page or among several pages of the document. In order to safeguard the robustness of the method against attacks, location of the security code watermarks is defined in a geolocation template (e.g. one per page or per document) which is encrypted, archived, and transmitted to the user in the same, or in a separate communication session, or via a separate communication link. In a one aspect the decryption key for the geolocation template is sent by the server to the recipient via a different communication link (e.g. as an OTP sent via Sort Messaging System (SMS) to the user's mobile telephone device).

As a third level of protection, the security codes are encrypted with one or more strong standard or proprietary encryption algorithms.

With the above security measures, a certified copy may be printed by the server and dispatched to the user, or the user may print the certified copy himself and then distribute it to any recipient.

Optional electronic signatures may be embedded in the secure document, using any known or proprietary e-signature protocol or software (e.g., AdobeSign, DocuSign, HelloSign, etc.).

In a variation of the above exemplary embodiment, the UV watermarks are printed on the front pages of the printed document, e.g., at the border so as not to overlap the document content.

Referring to FIG. 2, an example contract is presented, having Page 1 (i.e., the $1^{st}$ front page of document XYZ) 210, which contains a title and paragraphs 1-4, and Page 2 (i.e., the $2^{nd}$ front page of document XYZ) 240, which contains paragraphs 5-7, signature/date field 1, and signature/date field 2. Pages 1 and 2, 210, 240 are printed with an ordinary printer (e.g., an inkjet or laser printer).

The back of pages 210, 240, i.e., back pages 220, 250, are also printed with QR code 1 and QR code 2, 225, 255, respectively, using the same or other ordinary printer.

Back pages are also printed with a first set of security codes 235, 265, respectively, using a security printer and UV-sensitive ink or toner. The position of the security codes 235, 265 of each set of security codes printed on back pages 220, 250 may be different. This feature can be used so as to make it difficult to detect them. Even if they are detected, their unscrambling and decryption to recreate the original security codes is not obvious. One has to be given both the templates used to create and locate these codes and also the decryption keys for each page.

The same process may also be used in the exemplary embodiment where the security codes are printed on the border of front pages 210, 240 using UV-sensitive ink or toner.

System Diagram

Figure 3:
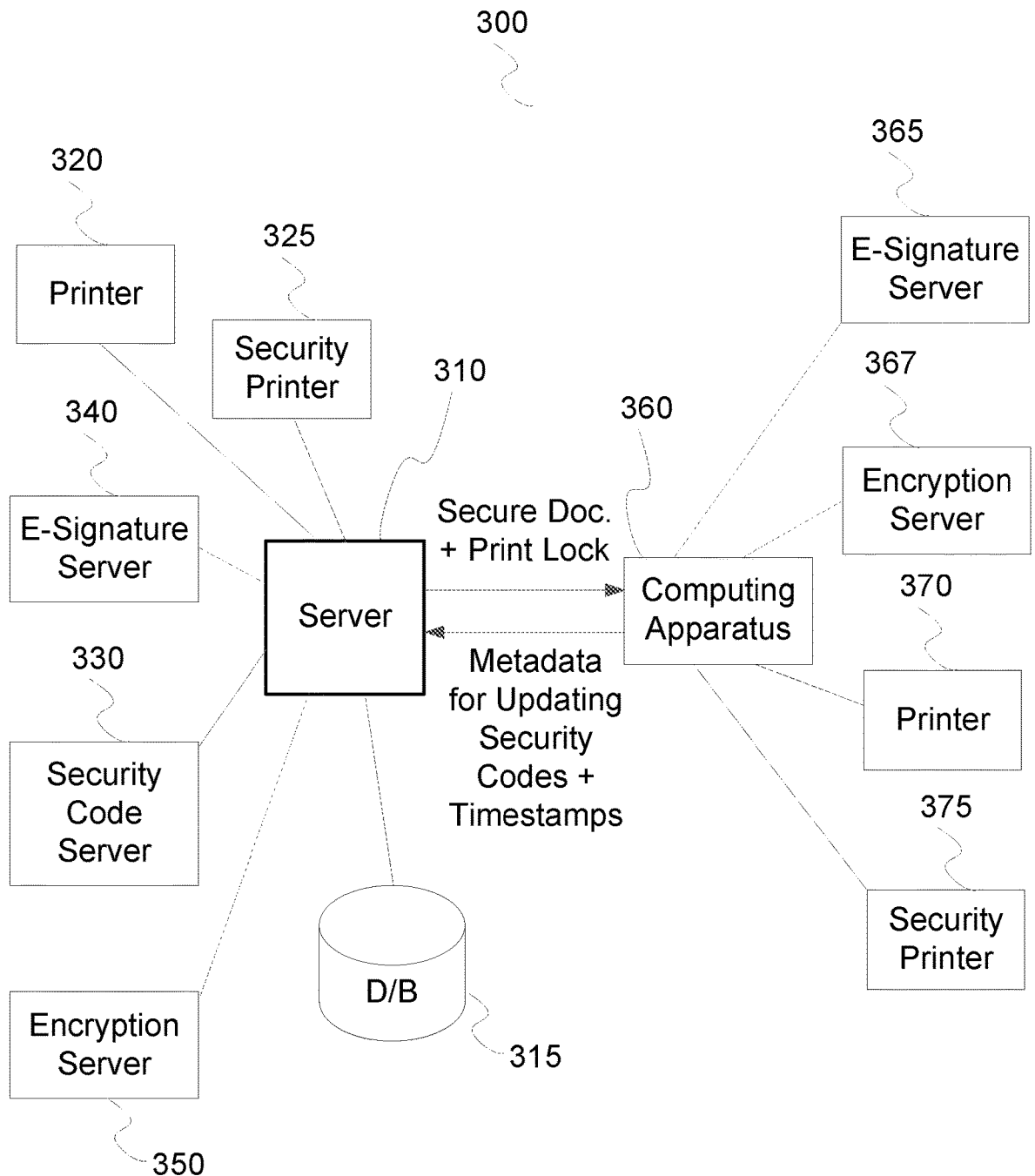
FIG. 3 shown an exemplary system diagram of a system used to implement the present innovative solution.

FIG. 3 shown an exemplary system diagram of a system used to implement the present innovative solution. System 300 is designed as a central management computing apparatus for handling the creation and archiving of secure documents, their management and printing, the management of client accounts and projects, and the communication with external computing apparatuses and systems. Server 300 has a database 315 (or in alternative embodiments is connected to a database sever 315) used for archiving the secure documents and the associated metadata. Server 310 is also connected to an ordinary printer 320 and to a security printer 325, for printing the document content and the security code watermarks. In an alternative exemplary embodiment, only security printer 325 is used, which printer has the capability to print using both visible (i.e., under visible light) and invisible (i.e., UV-visible) inks or toner.

Server 310 is also connected to an e-signature server 340 (e.g., a third-party server offering commercial e-signature services), a security code server 330 (i.e., a server creating security codes), and an encryption server 350 (i.e., a server creating encryption and decryption keys and using encryption and decryption algorithms for encrypting and decrypting the security codes). In alternative exemplary embodiments, some or all servers 330, 340, 350 are replaced by specialized hardware and/or software modules inside server 310.

Server 310 is connected, via a data connection, with one or more computing apparatuses 360, which are used by users to connect to server 310 for creating or uploading documents, editing, signing, managing, printing and paying for the security documents they order or consume as services offered by server 310. Computing apparatuses 360 send documents (not secured) and metadata relating to actions (e.g., printing, signing or editing the secure documents) to server 310, while they receive from server 310 secure documents (which have embedded security and QR codes, and also a print-count flag to ensure that the secure document can only be printed once by the user or by the recipient the user wants to send the document to.

Computing apparatus 360 may optionally be connected to an ordinary printer 370 and to a security printer 375, for printing the document content and the security code watermarks. In an alternative exemplary embodiment, only security printer 375 is used, which printer has the capability to print using both visible (i.e., under visible light) and invisible (i.e. UV-visible) inks.

Computing apparatus 360 may also be optionally connected with e-signature server 365, and encryption server 367, which may be the same as e-signature server 340 and encryption server 350, which are connected to server 310.

Software Architecture

Figure 4:
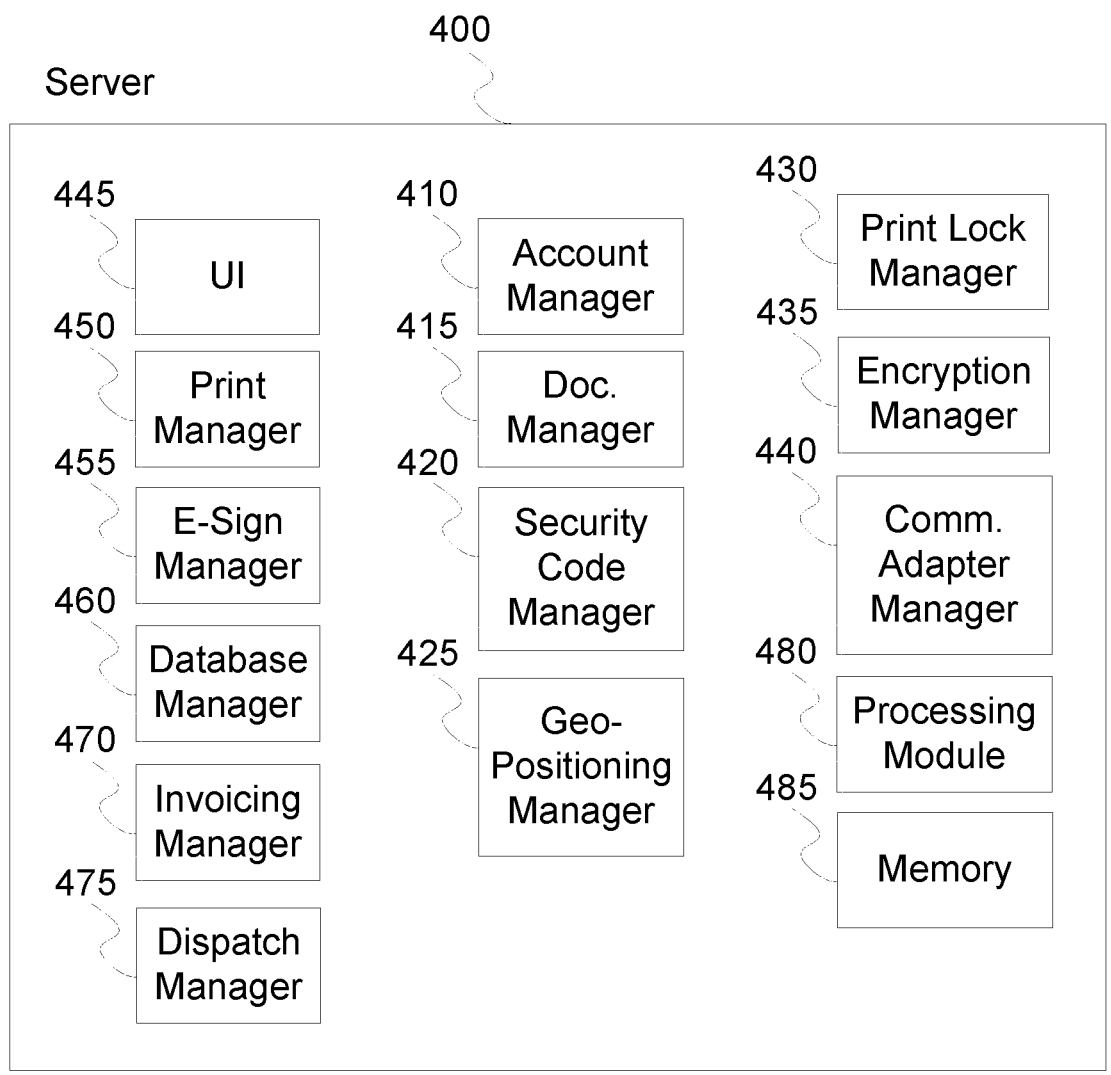
FIG. 4 shows an exemplary software architecture for the secure document server 310.
Figure 4:
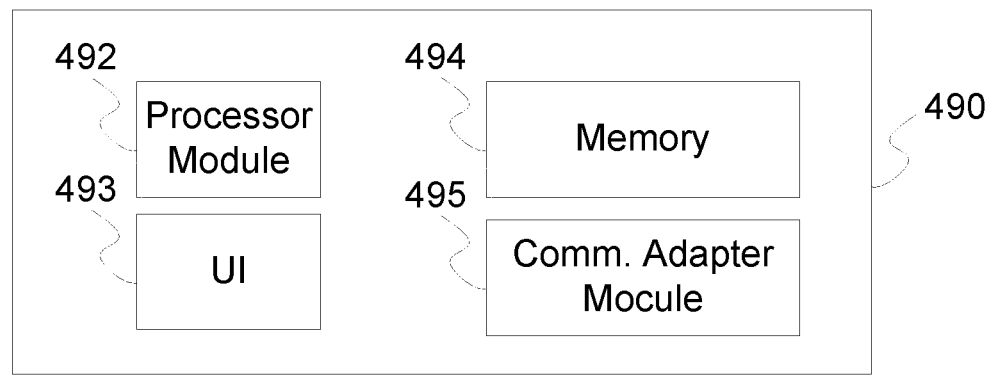

FIG. 4 shows an exemplary software architecture for the secure document server 310. Software architecture 400 shows the main software components of the secure document server. Other components may also be used or some of the illustrated components may be omitted or combined to form new components with the same capabilities of the merged components.

Software architecture 400 has an account manager 410 for managing user accounts, document manager 415 for managing secure documents, a security code manager 420 for managing the security codes that are embedded into the pages of the secure documents, a geo-positioning manager 425 for creating and managing the templates that are used to create the scrambled security codes and printing them on the secure documents, a print lock manager 430 for managing printing of the secure document copies, an encryption manager 435 for creating and managing encryption and decryption keys, a communications adapter manager 440 for managing connectivity with computing apparatuses 360, a User Interface (UI) 445 for interacting with an operator of server 310, a print manager 450 for printing secure document at printers 320, 325, an e-signature manager 455 for managing electronic signatures embedded in the secure documents, a database manager 460 for managing the archiving of secure documents, security codes, account and document data, and any other information related to a secure document or its oner, an invoicing manager 470 for managing invoices for the services bought by the user, a dispatch manager 475 for managing the dispatch of secure documents to the use who ordered their printing by server 310, a memory 485, and a processing module 480 for managing all the other modules and optionally for creating a secure document electronic file, associating the secure document with at least one parameter, generating a Quick Response (QR) code for each page of the secure document, generating at least one security code for each page of the secure document, generating a geolocation template for each page of the secure document, generating at least one timestamp for each page of the secure document, embedding the at least one encrypted security code, and the at least one timestamp in each page of the secure document electronic file using the geolocation template, embedding each QR code in a page of the security document electronic file, archiving the secure document electronic file and the geolocation template, and transmitting the secure document electronic file and the geolocation template to a computing apparatus.

Computing apparatus 490 is used by a user to connect to server 400 and to print, locally, the secure document. Computing apparatus 490 has a UI module 493, a memory 494, a communications adapter manager module 495, and a processor module 493 for managing all other modules. Additional modules may also be present, or some of the presented modules of the computing apparatus 400 may be omitted or combined, as apparent to a person skilled in related art.

Creating and Sending a Secure Document

Figure 5:
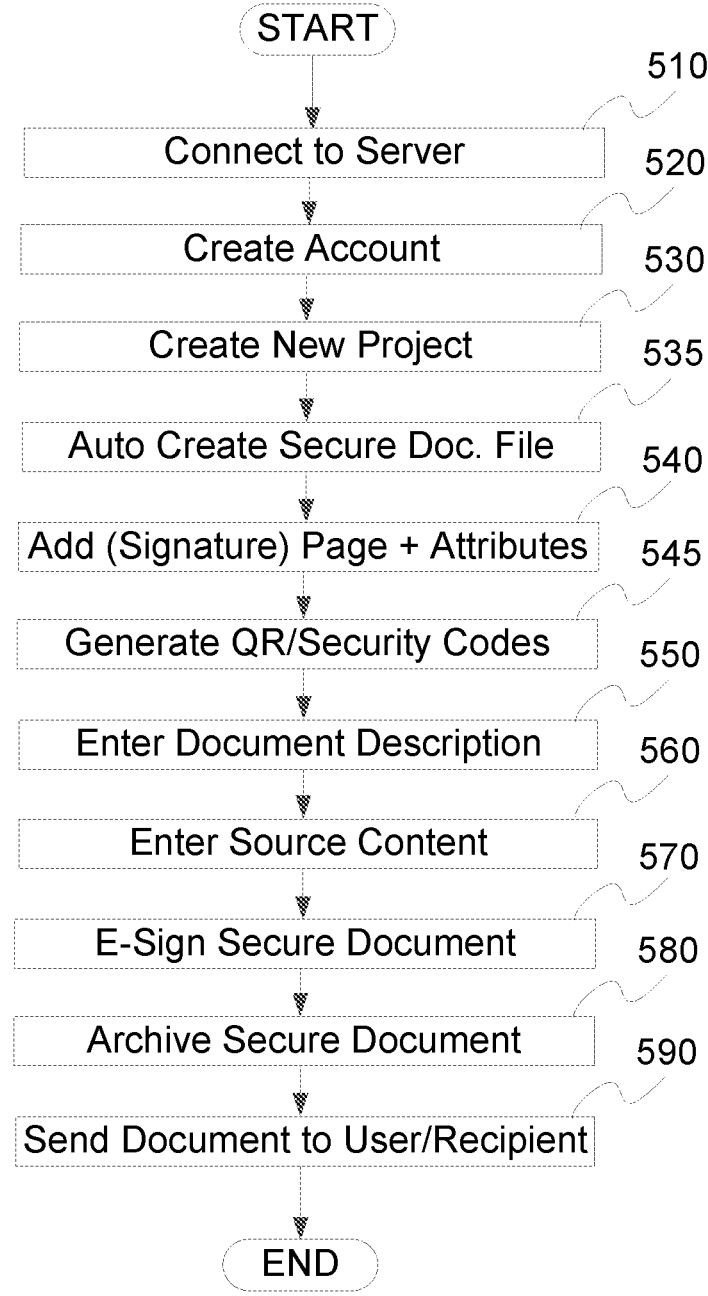
FIG. 5 shown an example use case for creating and sending a secure document.

FIG. 5 shown an example use case for creating and sending a secure document. Use case 500 starts with a user connecting 510 to the server, and creating a user account 520 (e.g., a personal account or a corporate account) if one such account does not already exist. If the user already has an account at the server, or after he creates the account, the user logs in to the account using his credentials. Having logged in his account, the user may select an existing project, or create a new project 530 and enter one or more attributes. The server associates these attributes with the project. By means of example, the attributes may include a project name, document name(s), project and document categories, status, company or person owning the project and files, document editors, etc.). A project may be the equivalent of a folder containing several secure documents and is suitable for new documents to be created or uploaded for archiving and management. Having created the project and/or set its document attributes, the server creates a set of empty secure document placeholders and associates them with the project 535.

The user may select any secure document placeholder and enter the number of pages, signature pages and any other attribute 540 relating to the selected document placeholder. The server, uses these attributes to generate the secure document, generate 545 a QR code, one or more security codes, one or more timestamps, a print-count flag (to enable a single copy or more copies of the security document to be printed), a filed for setting the person or entity allowed to print the document, and a geolocation template for printing the security codes on the print copy of the secure document using geo-positioning on the document page. All the previous security features, or a subset thereof, may be created for each page of the secure document, so that each page of the security document has a unique set of associated security features that are used for authenticating and for regulating the dissemination and printing of the secure document. These security features are then encrypted and embedded in the digital (i.e., archived version of the secure document). The dissemination and printing of the secure document may be enforced with a combination of encryption and decryption keys, One-Time-Passwords (OTP), etc.

Having created the secure document and embedded the security features in the document, the user may enter a document description 550. The user then enters the content of the document (e.g. by typing a contract, editing a lottery ticket with text and graphics, creating a bond template, etc.) or imports a non-secure document, text or graphics files that contain the desired content of the secure document. To import such source content, the user may use any standard UI offered by the server (e.g. file select from a list, drag-n-drop file, etc.) 560. He may also edit the imported document content to create the desired secure document layout and add or remove fields, like adding an e-signature field, or other. Such fields are optional and are applicable to different types of documents based on the type of document. For example, a digital signature field is needed in a secure contract but not in a secure lottery ticket.

The user may then electronically sign the secure document 570, if the document requires his signature. The electronic signature may be implemented by software and/or hardware forming part of the server, or in alternative implementations, the server contacts an external electronic signature server and consumes electronic signature services offered by the electronic signature server. Any type of electronic signature server, or protocol may be used.

The secure document is then archived 580 at the server or at a database or database server connected to the server and the secure document is then, optionally, sent 590 to the user or to a recipient requested by the user.

Printing a Secure Document

Figure 6:
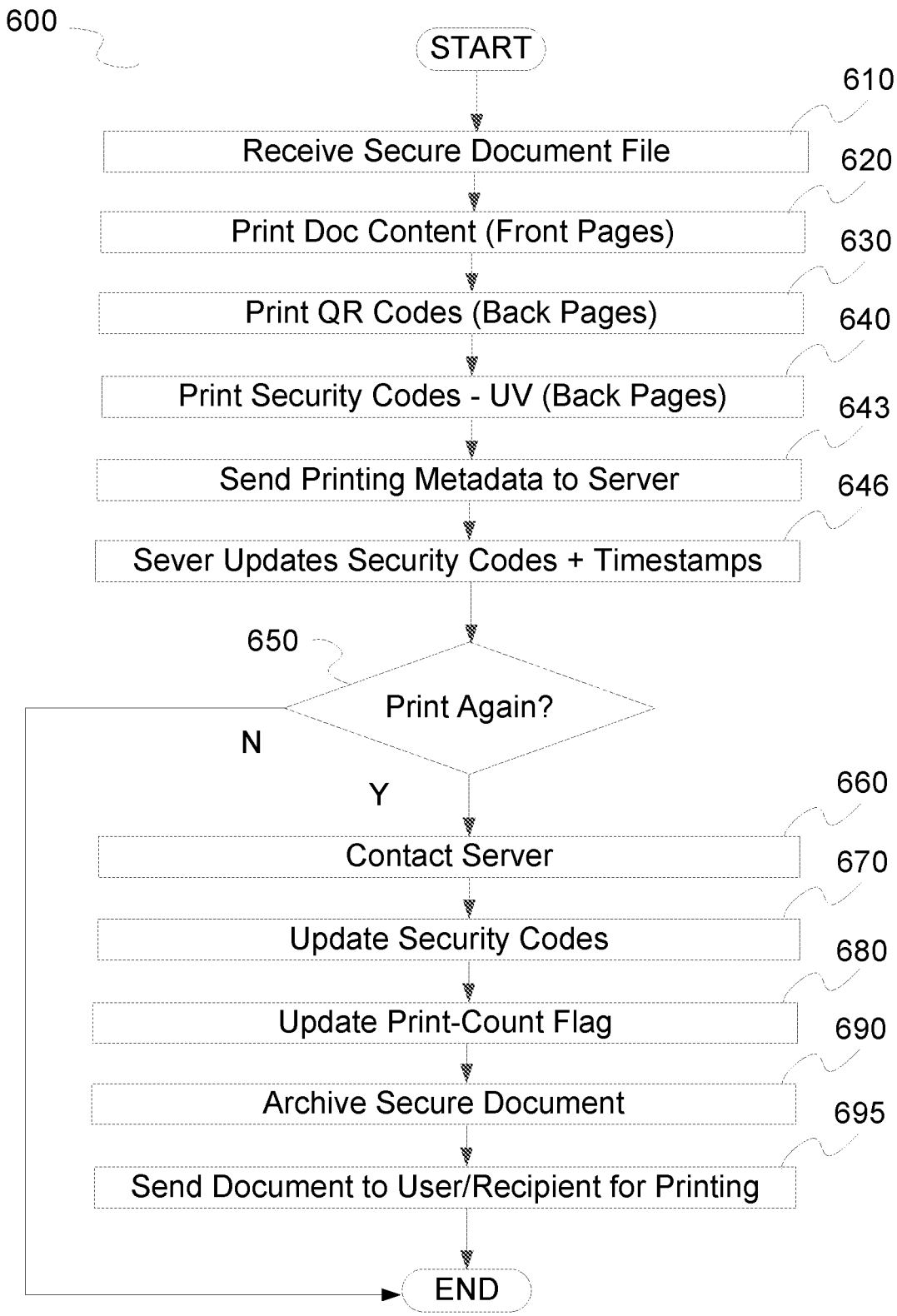
FIG. 6 shows an example use case for printing a secure document.

FIG. 6 shows an example use case for printing a secure document. Use case 600 starts with a user receiving a secure document file 610, e.g. by e-mail, by downloading the secure document file from the server, or via any other means suitable for transferring an electronic file. The user sends the document (i.e., text and graphics) to an ordinary printer 620 for printing the front pages of the secure document using regular ink, visible in daylight. The printer prints on the back pages of the secure document the corresponding QR codes 630 and the user feeds the same printed sheets to a security printer for printing at the back pages the security codes 640, according to the geo-localization template, using UV-sensitive ink.

Printing is allowed only once, so that a single copy of the electronic document is printed. This is achieved by using the print-count flag, which is encrypted and cannot be tampered with or changed by document processors, only reset by administration level processors with administration rights, in the event there is a printer related error. This prevents more than one copy of any document to be duplicated. Multiple copy document sets must have separate security codes entered for each copy, to prevent future duplication or alteration.

The printing information (e.g. printer used, person/entity that printed the secure document, timestamps, etc.) is automatically sent by the security printer (or by the software used to print at the security printer) to the server 643. The server, then updates 646 the security codes and timestamps that are embedded in the original copy of the secure document it has archived.

If the user or other recipient of the document wishes to print the document again, he needs to contact the server 660, and request a new secure document copy for printing. If this allowed by the document owner, or by a policy used to resolve such situations, the server updates the security codes 670 and the print-count flag 680 of the electronic document to allow the document to be printed again by its processor, archives the edited secure document 690 and sends a copy 695 to the recipient.

Amending a Secure Document

Figure 7:
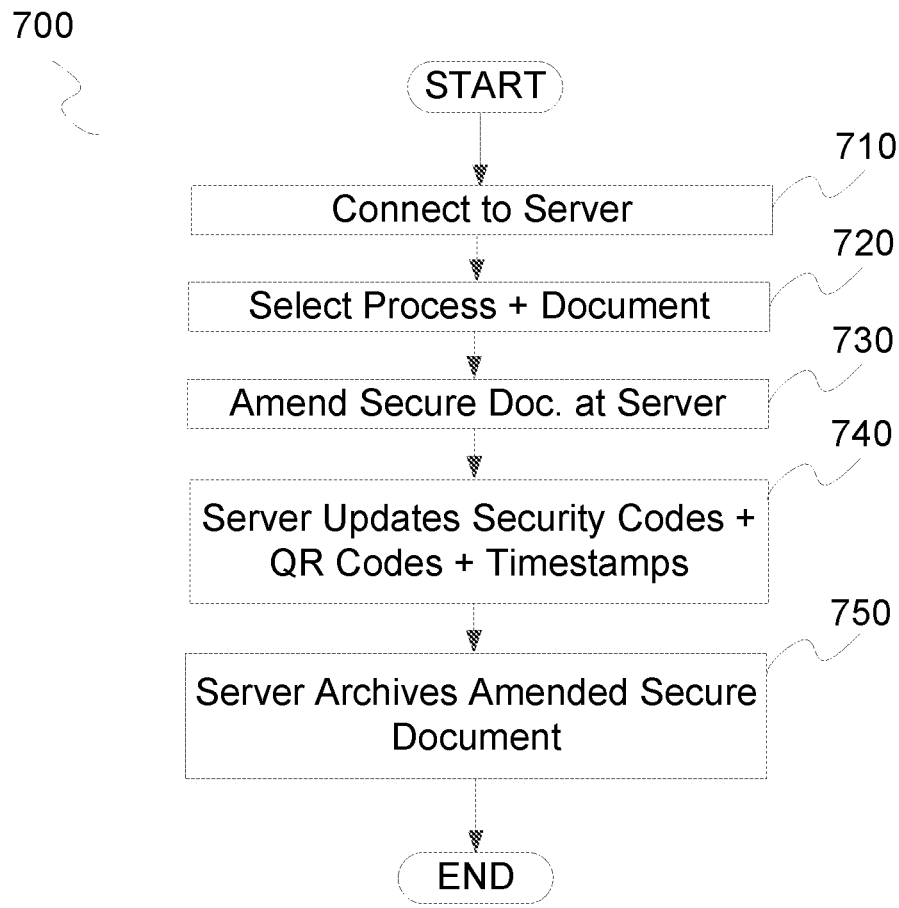
FIG. 7 shows an example use case for updating a secure document.

FIG. 7 shows an example use case for updating a secure document. Use case 700 starts with a user connecting 710 at the server, selecting a project and a document from the list of documents in the project 720, and amending the document 730.

After the user has finalized the amended secure document, the server updates the security features 740 of the secure document, i.e., some or all of the security codes, QR codes, geolocation template, print-count flag, etc., and archives the amended secure document 750.

A special case of amendment is the electronic signing of the secure document, which can be performed by any recipient authorized to sign the document, and which is controlled by the security features of the secure document.

The above exemplary implementations of the present innovative solution are not to be deemed as falling into the category of not patentable subject matter, and in particular they do not constitute automation or mere computer implementations of mental processes and non-patentable subject matter. The reason for not being directed to mental processes and non-patentable subject matter stems from the fact that the above exemplary implementations use a set of methodologies, hardware and software implementations that combine and transform individual known concepts, circuits, computing apparatuses, systems and software for general-purpose solutions to specific solutions for secure document management with higher security, versatility and adaptability than prior art. As a result, the known concepts, circuits, and software are repurposed to operate in a novel and distinct way that solve a very specific and previously unsolved problem, thus rendering them innovative and unanticipated to persons of ordinary skill in related art.

The examples used above to describe the present innovative solution should not be viewed as limiting the scope of the present innovative solution. The present innovative solution may be applied to use scenarios and settings other than those described in the presented examples.

The above exemplary are intended for use either as a standalone system or method in any conceivable scientific and business domain, or as part of other scientific and business methods, processes and systems.

The above exemplary embodiment descriptions are simplified and do not include hardware and software elements that are used in the embodiments but are not part of the current invention, are not needed for the understanding of the embodiments, and are obvious to any user of ordinary skill in related art. Furthermore, variations of the described method, system architecture, and software architecture are possible, where, for instance, method steps, and hardware and software elements may be rearranged, omitted, replaced with equivalent, or new added.

Various embodiments of the invention are described above in the Detailed Description. While these descriptions directly describe the above embodiments, it is understood that those skilled in the art may conceive modifications and/or variations to the specific embodiments shown and described herein unless specifically excluded. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

In one or more exemplary embodiments, the functions described may be implemented in hardware, software, firmware, or any combination thereof. If implemented in software as a computer program product, the functions may be stored on or transmitted over as one or more instructions or code on one or more computer readable media or mediums. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or any other device or apparatus operating as a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of managing secure documents, comprising using a server for:
   creating a secure document electronic file containing a secure document;
   associating the secure document with at least one parameter;
   generating a Quick Response (QR) code for each page of the secure document;
   generating at least one security code for each page of the secure document;
   generating a geolocation template for each page of the secure document;
   generating at least one timestamp for each page of the secure document;
   encrypting the at least one security code, the geolocation template, and the at least one timestamp for each page of the secure document;
   embedding the at least one encrypted security code, and the at least one encrypted timestamp in each page of the secure document electronic file using the geolocation template, wherein the embedding comprising using the geolocation template to print the at least one encrypted security code at least at one location in each page of the secure document, wherein the geolocation template comprises the at least one location of the at least one encrypted security code in each page of the secure document;

embedding each of the generated QR code in a page of the security document electronic file; and in response to the embedding of the at least one encrypted security code, the at least one encrypted timestamp and each of the generated QR code:

archiving the secure document electronic file and the encrypted geolocation template;

transmitting the secure document electronic file to a recipient; and transmitting the encrypted geolocation template to the recipient.

2. The method of claim 1, wherein the at least one security code for each page of the security document is generated by one of:

a random security code generator;

a statistical analysis module, wherein the statistical analysis module analyzes content of a corresponding page of the security document; and a natural language analysis module, wherein the natural language analysis module analyzes language content of the corresponding page of the security document.

3. The method of claim 1, further comprising:

the recipient, using a computing apparatus, electronically signing the secure document electronic file by connecting to an electronic signature server;

the recipient, using the computing apparatus, transmitting the electronically signed secure document electronic file to the server;

the server amending at least one of the encrypted security codes embedded in each page of the secure document electronic file; and the server adding a timestamp to the security document electronic file, wherein the added timestamp is associated with a time and date of the electronic signature.

4. The method of claim 1, further comprising the recipient using a computing apparatus for:

printing a content of the secure document with visible ink or toner; and using the geolocation template, printing the at least one security code for each page of the secure document at least at one location in each page of the secure document using an Ultra-Violet (UV)-sensitive ink or toner.

5. The method of claim 4, wherein the at least one security code for each page of the secure document is first scrambled by combining one of:

segments of the at least one security code in a same page, and then printed; and segments of the at least one security code across different pages, and then printed.

6. The method of claim 1, further comprising:

the recipient, using a computing apparatus, amending the secure document electronic file;

the recipient, using a computing apparatus, transmitting the amended secure document electronic file to the server;

the server amending at least one of the encrypted security codes embedded in each page of the secure document electronic file; and the server adding a timestamp to the security document electronic file, wherein the added timestamp is associated with the time and date of the amending the secure document electronic file.

7. A server for managing secure documents, comprising (a) a cryptography module, (b) a random security code generator module, (c) statistical analysis module, (d) a natural language analysis module, (e) a processing module and (f) a memory, the server being configured for:

creating a secure document electronic file containing a secure document using the processing module;

associating the secure document with at least one parameter using the processing module;

generating a Quick Response (QR) code for each page of the secure document using the processing module;

generating at least one security code for each page of the secure document, using one of the random security code generator module, the statistical analysis module, and the natural language analysis module;

generating a geolocation template for each page of the secure document using the processing module;

generating at least one timestamp for each page of the secure document using the processing module;

encrypting the at least one security code, the geolocation template, and the at least one timestamp for each page of the secure document using the cryptography module;

embedding the at least one encrypted security code, and the at least one encrypted timestamp in each page of the secure document electronic file using the geolocation template and the processing module, wherein the embedding comprising using the geolocation template to print the at least one encrypted security code at least at one location in each page of the secure document, wherein the geolocation template comprises the at least one location of the at least one encrypted security code in each page of the secure document;

embedding each of the generated QR code in a page of the security document electronic file using the processing module;

in response to the embedding of the at least one encrypted security code, the at least one encrypted timestamp and each of the generated QR code:

archiving the secure document electronic file and the encrypted geolocation template using the processing module;

transmitting the secure document electronic file to a computing apparatus; and transmitting the encrypted geolocation template to the computing apparatus.

8. The server of claim 7, wherein the server is further configured for communicating with at least one of:

an electronic signature server for receiving an electronic signature associated with the secure document electronic file;

a cryptography server;

a random security code generator server;

a statistical analysis server; and a natural language analysis server.

9. The server of claim 8, wherein the server is a Customer Relation Management (CRM) server.

10. The server of claim 8, wherein the server is further configured for:

amending at least one of the encrypted security codes embedded in each page of the secure document electronic file; and adding a timestamp to the security document electronic file, wherein the added timestamp is associated with a time and date of the electronic signature.

11. The server of claim 8, wherein the server is further configured for:
   printing a content of the secure document with visible ink; and
   using the geolocation template, printing the at least one security code for each page of the secure document at least at one location in each page of the secure document using an Ultra-Violet (UV)-sensitive ink or toner.

12. The server of claim 11, wherein the server is further configured for first scrambling the at least one security code for each page of the secure document by combining one of:
   segments of the at least one security code in a same page, and then printing the at least one security code; and
   segments of the at least one security code across different pages, and then printing the at least one security code.

13. The server of claim 7, wherein the server is further configured for:
   receiving the secure document electronic file in an amended form;
   amending at least one encrypted security code embedded in each page of the amended secure document electronic file; and
   adding a timestamp to the security document electronic file, wherein the added timestamp is associated with a time and date of the amending the secure document electronic file.

14. A computer program product including one or more non-transitory computer readable mediums for managing secure documents, the one or more non-transitory computer readable mediums comprising instructions to cause a server, comprising a cryptography module, (b) a random security code generator module, (c) statistical analysis module, (d) a natural language analysis module, and (e) a processing module, to:
   create a secure document electronic file containing a secure document using the processing module;
   associate the secure document with at least one parameter using the processing module;
   generate a Quick Response (QR) code for each page of the secure document using the processing module;
   generate at least one security code for each page of the secure document, using one of the random security code generator module, the statistical analysis module, and the natural language analysis module;
   generate a geolocation template for each page of the secure document using the processing module;
   generate at least one timestamp for each page of the secure document using the processing module;
   encrypt the at least one security code, the geolocation template, and the at least one timestamp for each page of the secure document using the cryptography module;
   embed the at least one encrypted security code, and the at least one encrypted timestamp in each page of the secure document electronic file using the geolocation template and the processing module, wherein the embedding comprising using the geolocation template to print the at least one encrypted security code at least at one location in each page of the secure document, wherein the geolocation template comprises the at least one location of the at least one encrypted security code in each page of the secure document;
   embed each of the generated QR code in a page of the security document electronic file using the processing module;
   in response to the embedding of the at least one encrypted security code, the at least one encrypted timestamp and each of the generated QR code:
   archive the secure document electronic file and the encrypted geolocation template using the processing module;
   transmit the secure document electronic file to a computing apparatus; and
   transmit the encrypted geolocation template to the computing apparatus.

15. The computer program product of claim 14, wherein the one or more non-transitory computer readable mediums further comprises instructions to cause the server to communicate with at least one of:
   an electronic signature server for receiving an electronic signature associated with the secure document electronic file;
   a cryptography server;
   a random security code generator server;
   a statistical analysis server; and
   a natural language analysis server.

16. The computer program product of claim 15, wherein the one or more non-transitory computer readable mediums further comprises instructions to cause the server to:
   amend at least one of the encrypted security codes embedded in each page of the secure document electronic file; and
   add a timestamp to the security document electronic file, wherein the added timestamp is associated with a time and date of the electronic signature.

17. The computer program product of claim 15, wherein the one or more non-transitory computer readable mediums further comprises instructions to cause the server to:
   print a content of the secure document with visible ink; and
   using the geolocation template, print the at least one security code for each page of the secure document at least at one location in each page of the secure document using an Ultra-Violet (UV)-sensitive ink or toner.

18. The computer program product of claim 17, wherein the one or more non-transitory computer readable mediums further comprises instructions to cause the server to first scramble the at least one security code for each page of the secure document by combining one of:
   segments of the at least one security code in a same page, and then print the at least one security code; and
   segments of the at least one security code across different pages, and then print the at least one security code.

19. The computer program product of claim 14, wherein the one or more non-transitory computer readable mediums further comprises instructions to cause the server to:
   receive the secure document electronic file in an amended form;
   amend at least one encrypted security code embedded in each page of the amended secure document electronic file; and
   add a timestamp to the security document electronic file, wherein the added timestamp is associated with a time and date of the amending the secure document electronic file.

* * * * *